(12) United States Patent
Kahle et al.

(10) Patent No.: US 11,541,709 B2
(45) Date of Patent: Jan. 3, 2023

(54) VEHICLE FOR THE TRANSPORT OF PERSONS AND/OR GOODS

(71) Applicant: ONOMOTION GmbH, Berlin (DE)

(72) Inventors: Philipp Kahle, Berlin (DE); Normann Löffler, Berlin (DE); Sabine Merkel, Straßkirchen (DE); Josef Seidl, Straßkirchen (DE); Maximilian Knott, Starnberg (DE); Anna Müller, Munich (DE)

(73) Assignee: ONOMOTION GMBH, Berlin (DE)

( * ) Notice: Subject to any disclaimer, the term of this patent is extended or adjusted under 35 U.S.C. 154(b) by 0 days.

(21) Appl. No.: 17/482,866

(22) Filed: Sep. 23, 2021

(65) Prior Publication Data

US 2022/0105763 A1    Apr. 7, 2022

(30) Foreign Application Priority Data

Oct. 1, 2020   (EP) .................................... 20199546

(51) Int. Cl.
*B60G 1/02*    (2006.01)

(52) U.S. Cl.
CPC ............ *B60G 1/02* (2013.01); *B60G 2200/10* (2013.01); *B60G 2200/30* (2013.01)

(58) Field of Classification Search
CPC ........ B60G 1/02; B60G 1/04; B60G 2200/10; B60G 2200/30; B60G 2300/04; B60G 2300/38; B60G 3/08; B60G 3/145
See application file for complete search history.

(56) References Cited

U.S. PATENT DOCUMENTS 3,612,566 A    10/1971  Sholl
5,161,814 A *  11/1992  Walker .................... B60P 1/022
                                                      280/43.24

(Continued)

FOREIGN PATENT DOCUMENTS

CA          3040416 A1 *  3/2020  ............. B60G 11/27
CN          105564177         5/2016

(Continued)

OTHER PUBLICATIONS

Adolfs Manfred, "Machine Translation of EP 1122101 A2 Obtained Jun. 13, 2022", Aug. 8, 2001, Entire Document. (Year: 2001).*

(Continued)

*Primary Examiner* — James A English
*Assistant Examiner* — Scott F. Underwood
(74) *Attorney, Agent, or Firm* — Hamre, Schumann, Mueller & Larson, P.C.

(57) ABSTRACT

A vehicle for transporting persons and/or goods, having at least one frame which includes of at least one frame element which extends substantially parallel or obliquely to the longitudinal direction of the vehicle, at least one wheel carrier which can be detachably secured to the frame element and which, together with the frame element, forms a receiving region between the wheel carrier and the frame element. The wheel carrier and the frame element are spaced apart from one another at least in sections so as to form a cavity. The frame also includes at least one wheel unit which includes a wheel and can be fixed or is fixed in a rotatably mounted manner at least in sections in the receiving region between the wheel carrier and the frame element.

15 Claims, 2 Drawing Sheets

(56) References Cited

U.S. PATENT DOCUMENTS

| | | | | |
|---|---|---|---|---|
| 5,863,049 A * | 1/1999 | Mahvi | ............... | B60P 1/027 |
| | | | | 280/6.151 |
| 7,455,131 B2 | 11/2008 | Rittenhouse | | |
| 2006/0186616 A1* | 8/2006 | Rudiger | ............ | B60G 3/14 |
| | | | | 280/6.15 |
| 2018/0319238 A1* | 11/2018 | Denton, III | ......... | B62D 63/08 |
| 2021/0162848 A1* | 6/2021 | Vailliencourt | ....... | B62D 21/11 |

FOREIGN PATENT DOCUMENTS

| | | | | |
|---|---|---|---|---|
| CN | 105818670 | | 8/2016 | |
| CN | 106882274 B | | 4/2019 | |
| CN | 108045187 B | | 2/2020 | |
| CN | 111137089 A * | | 5/2020 | |
| DE | 4021140 A1 * | | 1/1992 | |
| DE | 29701795 U1 | | 10/1997 | |
| DE | 10347579 A1 * | | 5/2005 | ............ A61G 5/10 |
| EP | 1122101 | | 8/2001 | |
| EP | 2326798 | | 6/2011 | |
| FR | 1221658 | | 6/1960 | |
| WO | WO-2016124791 A1 * | | 8/2016 | ............ B61D 3/185 |
| WO | WO-2018108332 A1 * | | 6/2018 | ............ B61D 3/185 |

OTHER PUBLICATIONS

European Search and Examination Report issued for European Application No. 20199546.1, dated Mar. 5, 2021, 12 pages.

\* cited by examiner

VEHICLE FOR THE TRANSPORT OF PERSONS AND/OR GOODS

FIELD OF INVENTION

The invention relates to a vehicle for transporting persons and/or goods.

BACKGROUND

From the prior art, vehicles are known that use axle bearings that are open at the bottom. In such vehicles, the wheel hub is inserted from below. In order to fit, maintain or repair a wheel unit, the vehicle must be raised by the wheel diameter of the wheel unit in order to remove the wheel of the wheel unit. This proves to be a disadvantage especially with heavy vehicles.

In addition, vehicles with bearings on only one side are known, where the axle is usually located on one side of the vehicle. When the wheel unit is relieved of load, it is possible to dismantle and mount a wheel from the side. However, strong bending forces occur in heavy vehicles, so that the axle and the frame accommodating the axle must be designed to be massive.

SUMMARY

One task of an embodiment of the invention is to propose a vehicle for transporting persons and/or goods, in which assembly and/or disassembly of a wheel is facilitated.

This task is achieved by a vehicle for transporting people and/or goods with at least one frame which comprises at least one frame element which extends essentially parallel or obliquely to the longitudinal direction of the vehicle, with at least one wheel carrier, which can be detachably fixed to the frame element and which, together with the frame element, forms a receiving region between the wheel carrier and the frame element, in which the wheel carrier and the frame element are spaced apart from one another at least in sections so as to form a cavity, and having at least one wheel unit which comprises a wheel and can be fixed or is fixed in a rotatable manner at least in sections in the receiving region between the wheel carrier and the frame element.

Because the vehicle comprises of a wheel carrier on which the wheel unit can be rotatably fixed and which can be detachably arranged on the frame element of the frame of the vehicle, the wheel unit comprising a wheel can be easily assembled and dismantled. In particular, lifting the vehicle can be dispensed with, provided that partial unloading of the wheel unit is possible.

As the wheel carrier can be releasably fixed on the frame element, the wheel unit can be preassembled on the wheel carrier before the wheel carrier is fixed on the frame element. This makes assembly and disassembly easier.

The vehicle can be, for example, an electric motor-driven, combustion engine-driven and/or muscle power-driven vehicle. In addition, the vehicle can be a trailer or any type of push and/or pull vehicle. In a preferred embodiment, the vehicle comprises of a transport wheel, which comprises a driver area, in which or on which a vehicle occupant can be placed and in particular by means of a pedal unit moving the trolley under muscle power, and which comprises a loading surface-like transport area, in which or on which an additional load, such as a transport box, persons or any kind of objects can be placed.

The frame element can in principle be arranged at any point on the frame of the vehicle. In one embodiment, the frame element surrounds the vehicle laterally on its outside at least in sections. This improves the accessibility of the wheel unit and further facilitates the assembly and disassembly of the wheel unit.

In principle, the wheel carrier can be permanently fixed on the frame element, for example welded, soldered or glued. In addition, it is conceivable that the wheel unit can be permanently fixed on the wheel carrier and is mounted or dismantled together with the wheel carrier. In one embodiment of the vehicle, however, it proves advantageous if the wheel carrier can be detachably fixed to the frame element and/or the wheel unit can be detachably fixed to the wheel carrier.

This makes it easier to assemble or disassemble individual components and assemblies.

Furthermore, the wheel unit can be rotatably mounted exclusively on the wheel carrier. In such cases, the frame can be designed with a reduced number of components.

The receiving area formed by a cavity between the wheel carrier and the frame element can be formed by an area of the frame element receding with respect to its extension in the direction of the vehicle, by a section of the wheel carrier moulded on in the direction away from the wheel unit and/or by at least one spacer element spacing the frame element and the wheel carrier from each other. As a result, the receiving area encompassing the cavity can be designed in a simple manner.

In order to reduce the risk of the wheel unit bending, for example if the vehicle transports a high dead weight or a high additional load, one embodiment of the vehicle provides that the wheel unit comprises at least one wheel bearing around which the wheel of the wheel unit is rotatably mounted is rotatably and detachably fixed to the wheel carrier with a first wheel bearing element and/or which can be fixed with a second wheel bearing element opposite the first wheel bearing element in a rotationally fixed manner to an axis of the vehicle that is fixed on the frame, in particular on the frame element.

In such cases, the wheel unit can be fixed via the wheel bearing only to the wheel carrier or only to the frame, in particular to the frame element, or on the one hand to the wheel carrier and on the other hand to the axle of the wagon. In the latter case, high forces can be absorbed by the wheel unit, whereby the risk of bending the wheel unit is reduced.

The wheel unit can be fixed directly or indirectly to the wheel carrier and/or to the axle of the vehicle. The coupling of the wheel unit to the wheel carrier and/or the axle can take place in a force-locking, frictional and/or positive-locking manner. If the coupling takes place in a form-fitting manner, the first wheel bearing element and/or the second wheel bearing element can comprise an outer contour which is designed to correspond, in particular to complement, an inner contour of a receptacle of the wheel carrier and/or a receptacle of the axle of the vehicle.

In order to fix the wheel unit to the wheel carrier in a simple manner, in a further development of the latter embodiment, at least one screw-bolt-shaped fixing means is provided, which comprises a head section at one end and an external thread section at the opposite end, and which can be inserted through at least one through-opening in the wheel carrier for joining the wheel bearing to the wheel carrier and can be fixed in a recess in the wheel bearing, wherein the through-opening in the wheel carrier has a diameter which is smaller than the diameter of the head portion of the fixing means, and wherein the recess comprises of an internally threaded portion which is of a corresponding, in particular complementary, design to the externally threaded portion of the fixing means.

In such a case, the wheel unit can be screwed to the wheel carrier in a simple manner.

In order to prevent an unintentional relative movement between the wheel unit and the wheel carrier, at least two, in particular at least three locking means can be provided, which connect the wheel carrier and the wheel unit to each other at a distance from the axis of rotation of the wheel unit.

In addition, it is advantageous if the vehicle comprises of at least one brake unit which comprises of at least one brake disc which can be or is connected non-rotatably to the wheel on the side of the wheel unit facing the wheel carrier, and which comprises of at least one clamping means arranged on the wheel carrier, through which the brake disc can be clamped.

The brake disc can be connected directly or indirectly to the wheel. The fact that the clamping disc can be arranged on the wheel carrier means that the clamping disc and the wheel carrier can be joined together in a pre-assembled state. In addition, assembly and disassembly of the wheel unit is made easier because the individual components of the brake unit are easily accessible.

The vehicle can comprise a large number of components or assemblies to which electrical energy can be supplied by means of cables and/or which can be controlled by means of cables. In addition, the vehicle can comprise of a number of cable pulls by which individual components or assemblies are controlled. Further, the vehicle may comprise of a hydraulic system with hydraulic lines running through the vehicle.

In the following, the term "line" is used collectively for electrical or hydraulic lines and/or cables as well as mechanical cable pulls.

In one embodiment of the vehicle, it is planned that the wheel carrier comprises of at least one holding means on the side facing the wheel unit, on which at least one line fixed on the frame element can be fixed, in particular on which at least one line can be fixed or connected to the clamping means of the brake unit.

The provision of at least one clamping means limits possible movements of the cable in the area of the wheel carrier, which can be caused for example by movements or vibrations of the vehicle.

The vehicle may be a variety of vehicles, especially trucks and trailers, as previously described. If loads or persons are transported with the vehicle, it is advantageous in one embodiment of the vehicle, if it has at least one base plate which can be fixed or secured directly or indirectly to the frame, in particular to the frame element, and on which at least one additional load can be arranged.

The base plate is preferably arranged to run above the wheel bearing of the wheel unit. In addition, the wheel bearing of the wheel unit can be arranged to run above the base plate.

The recessed area of the frame element can be technically implemented in any way, as long as it fulfils the function of providing a recessed area with respect to the direction of extension of the frame element. In embodiments of the vehicle, the recessed area of the frame element is formed by a moulded portion of the frame element and/or by a recess.

If the recessed area of the frame element is formed by a moulded portion of the frame element, the recessed area can be realised without weakening the material of the frame element. If the moulded section of the frame element is formed by a recess, the vehicle can be made compact.

Alternatively or in addition to this, it is advantageous if the wheel carrier can be fixed or secured to the frame element with one end or with two ends outside the receiving area of the frame element.

If only one end of the wheel carrier is fixed to the frame element, the receiving area forming a cavity is not entirely surrounded by the wheel carrier and frame element, but rather is open on one side.

If the wheel carrier is only fixed to the frame element at two ends, the receiving area forming a cavity is completely surrounded by the wheel carrier and frame element in a frame-like manner.

If the wheel carrier comprises of a portion formed opposite the recessed portion of the frame element in the direction away from the wheel unit, the recessed area of the frame element can be designed to be less pronounced. This reduces the space required for carrying the frame element in the direction of the centre of the vehicle, which increases the transport capacity of the vehicle. In addition, as a result, existing frame elements can accommodate a wheel unit without cumbersome modification measures.

If the wheel carrier is fixable to the frame element outside the recessed area of the frame element, the available space for arranging the wheel unit is maximised.

In order to facilitate joining and mounting of the wheel unit to the wheel carrier and/or of the wheel carrier to the frame element, in one embodiment of the trolley, the wheel carrier comprises of at least one continuous opening through which the wheel unit is accessible from a side of the wheel carrier facing away from the wheel unit.

Further features, details and advantages of the invention are apparent from the appended patent claims, from the drawing and from the following description of a preferred embodiment of the vehicle.

DETAILED DESCRIPTION OF VARIOUS EMBODIMENTS

Figure 1:
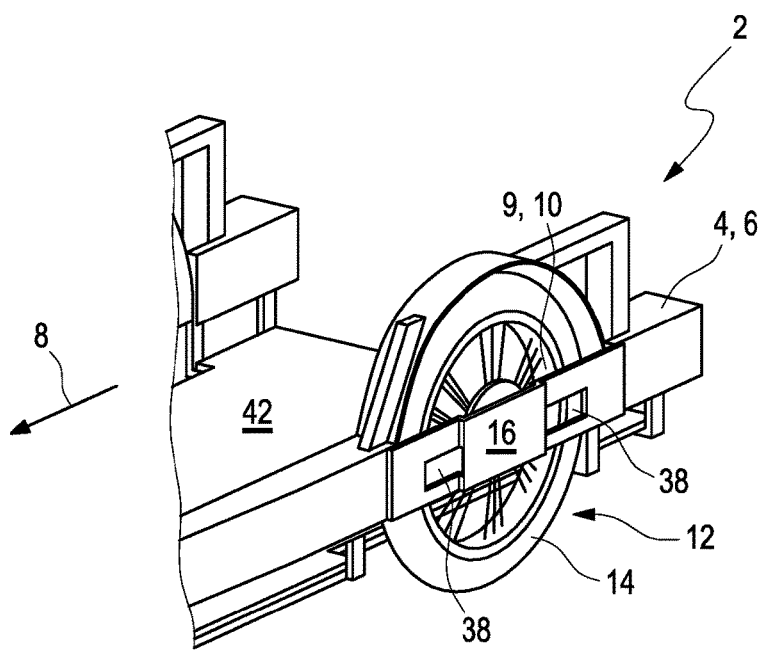
FIG. 1 An isometric side view of a section of a first embodiment of the carriage.
Figure 3:
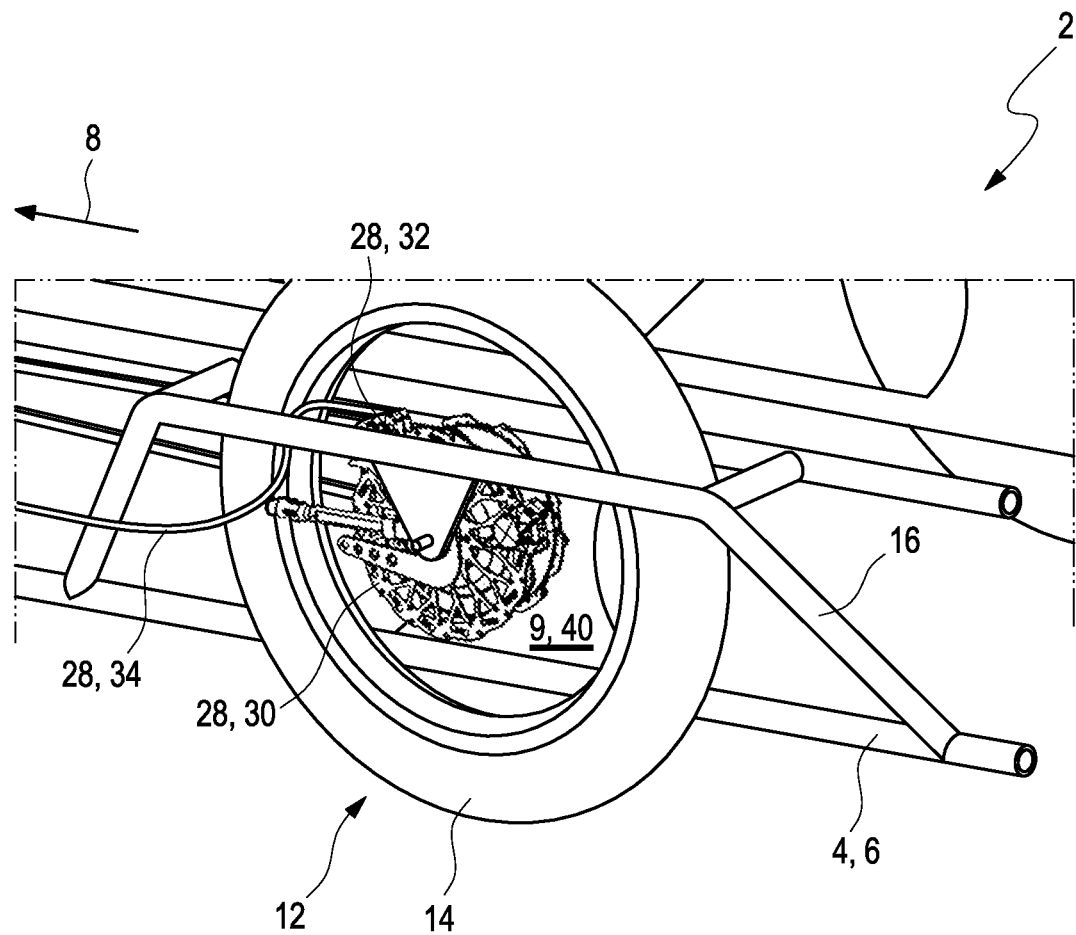
FIG. 3 An isometric side view of a section of a second embodiment of the vehicle.

FIGS. 1 and 3 each show a vehicle for transporting people and/or goods, marked overall with the reference sign 2. Vehicle 2 comprises of at least one frame 4, which in turn comprises at least one frame element 6. The frame element 6 is extended substantially parallel to a longitudinal direction 8 of the vehicle 2.

Wheel carrier 16 and frame element 6 form a receiving area 9 between wheel carrier 16 and frame element 6, in which wheel carrier 16 and frame element 6 are spaced apart from each other enclosing a cavity.

In order to form the receiving area 9, in the exemplary embodiment according to FIG. 1, the frame element 6 comprises of an area 10 that is set back with respect to its extension in the direction of the vehicle 2. The area 10 of the frame element 6 that is recessed towards the vehicle 2 is open towards the outside.

Furthermore, the vehicle 2 comprises a wheel unit 12 which has a wheel 14. The wheel unit 12 is arranged at least in sections in the recessed area 10 of the frame element 6.

In order to fix the wheel unit 12, the vehicle 2 comprises of a wheel carrier 16 which can be fixed on the frame element 6, which overlaps the recessed area 10 of the frame element 6 in a fixed arrangement (FIG. 1) and on which the wheel unit 12 is rotatably fixed.

Figure 2:
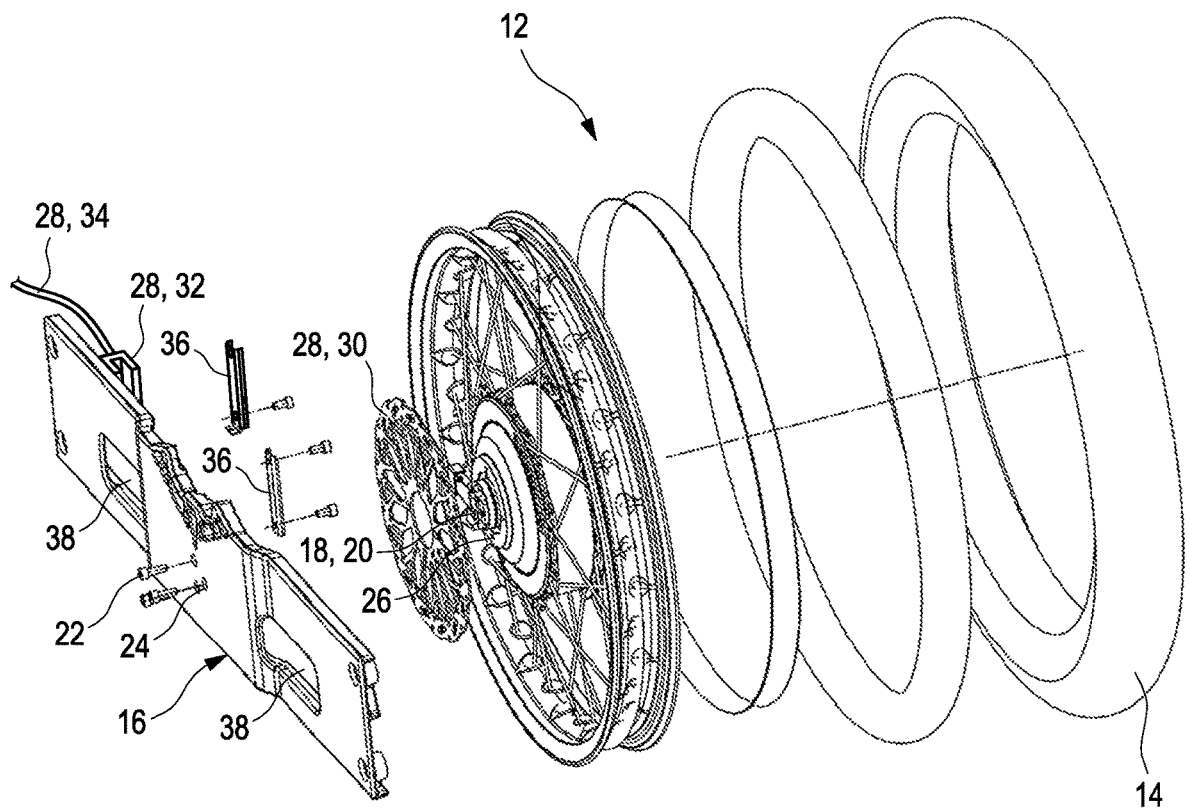
FIG. 2 An exploded view of a wheel carrier on a wheel unit of the vehicle according to FIG. 1

The individual components of the vehicle 2, in particular the wheel unit 12 and the wheel carrier 16, are described in more detail below with reference to FIG. 2:

The wheel unit 12 comprises of a wheel bearing 18, by means of which the wheel unit 12 can be detachably fixed to the wheel carrier 16 in the embodiment example shown in FIG. 2. For this purpose, the wheel bearing 18 comprises of a first wheel bearing element 20 which is non-rotatably and releasably fixed to the wheel carrier 16. In order to secure the first wheel bearing element 20 of the wheel bearing 18 to the wheel support 16, the wheel bearing 18 comprises of a three bolt-shaped securing means 22, each comprising of a head portion at one end and an external thread at the opposite end, which can be inserted through at least one through-aperture 24 in the wheel support 16 and secured in a recess 26 in the wheel bearing 18 in order to join the wheel bearing 18 to the wheel support 16. For this purpose, the recesses 26 in the wheel bearing 18 each comprise of an internal threaded section in which the fixing means 22 can be fixed with an external threaded section opposite the head section.

In addition, the vehicle 2 comprises of a brake unit 28, which comprises of at least one brake disc 30, which is non-rotatably connected to the wheel 14 on the side of the wheel unit 12 facing the wheel carrier 16 and which comprises of at least one clamping means 32 arranged on the wheel carrier 16 by which the brake disc 30 can be clamped. The brake unit 28 can be actuated by a line 34. This can be fixed to the wheel carrier 16 with holding means 36. In order to increase accessibility to the wheel unit 12, two continuous openings 38 are arranged in the wheel carrier 16 in the embodiment example shown in the figures.

In order to fix the wheel unit on the frame element 6, the wheel unit 12 is arranged at least in sections in the recessed area 10. In order to keep the recessed area 10 structurally small, the wheel carrier 16 according to FIGS. 1 and 2 comprises of an integrally formed section 40 opposite the recessed area 10 and extending away from the frame element 6. In the embodiment of FIGS. 1 and 2, the recessed area 10 of the frame element 6 and the section 40 of the wheel carrier 16, which is formed to extend away from the frame element 6, form the receiving area 9.

In order to transport loads, the vehicle 2 comprises of a base plate 42 which is fixed directly to the frame 4, in particular to the frame element 6, and on which at least one additional load can be arranged.

FIG. 3 shows a second embodiment of the vehicle 2, in which the receiving area 9 is formed exclusively by a section 40 of the wheel carrier 16 that extends away from the frame element 6. This allows the frame element 6 to be formed without deformation and without weakening the material.

In the following, the mode of operation of the vehicle 2 is briefly described:

To mount a wheel unit 12 on the frame element 6, the wheel unit 12 is fixed to the wheel support 16 by means of the fixing means 22. For this purpose, the brake disc 30 of the brake unit 28 can first be fixed to the wheel unit 12 in order to then be arranged in such a pre-assembled manner on the wheel carrier 16. According to this, the clamping means 32 of the brake unit 28 can be fixed to the wheel carrier 16 and can be coupled either already pre-assembled to the line 34 or connectable to the line 34. The entire system consisting of wheel carrier 16, wheel unit 12 and brake unit 28 can be fixed to frame element 6 in this way.

The features of the invention disclosed in the above description, in the claims and in the drawing can be essential both individually and in any combination in the implementation of the invention in its various embodiments.

LIST OF REFERENCE SYMBOLS

2 Vehicle
4 Frame
6 Frame element
8 Lengthwise
10 Recessed area
12 Wheel unit
14 Wheel
16 Wheel carrier
18 Wheel bearing
20 First wheel bearing element
22 Fixing means
24 Continuous opening
26 Recess
28 Brake unit
30 Brake disc
32 Clamping means
34 Line
36 Holding means
38 Opening
40 Preformed section
42 Base plate

We claim:

1. A vehicle for transporting persons and/or goods, comprising at least one frame which comprises:
   at least one frame element which extends substantially parallel or obliquely to a longitudinal direction of the vehicle,
   at least one wheel carrier which is able to be detachably secured to the at least one frame element and which, together with the at least one frame element, forms a receiving region between the at least one wheel carrier and the at least one frame element in which the at least one wheel carrier and the at least one frame element are spaced apart from one another at least in sections so as to form a cavity, and
   at least one wheel unit which comprises a wheel and is able to be fixed or is fixed in a rotatably mounted manner at least in the sections in the receiving region between the at least one wheel carrier and the at least one frame element,
   wherein the at least one wheel unit comprises at least one wheel bearing about which the wheel of the at least one wheel unit is rotatably mounted, which the at least one wheel bearing is able to be non-rotatably and releasably fixed to the at least one wheel carrier by means of a first wheel bearing element and/or is able to be non-rotatably fixed to an axle of the vehicle fixed to the at least one frame by means of a second wheel bearing element opposite the first wheel bearing element,
   wherein at least one screw- or bolt-shaped fixing means, which comprises a head portion at one end and an external thread portion at the opposite end, and which is able to be inserted through at least one through-opening in the at least one wheel carrier and fixed in a recess in the at least one wheel bearing for joining the at least one wheel bearing to the at least one wheel carrier, wherein the at least one through-opening in the at least one wheel carrier has a diameter which is smaller than a diameter of the head portion of the fixing means and wherein the recess comprises an internal thread portion which is of a corresponding design to the external thread portion of the fixing means.

2. The vehicle according to claim 1, wherein the receiving region formed by the cavity between the at least one wheel carrier and the at least one frame element is formed by an area of the frame element which is recessed with respect to an extension in the direction of the vehicle, by a portion of the at least one wheel carrier which is integrally formed in a direction away from the at least one wheel unit and/or by at least one spacer element which spaces the at least one frame element and the at least one wheel carrier from one another.

3. The vehicle according to claim 2, wherein the recessed area of the at least one frame element is formed by an integrally formed portion of the at least one frame element and/or by a second recess.

4. The vehicle according to claim 2, wherein the at least one wheel carrier is able to be fixed or is fixed to the at least one frame element with one end or with two ends outside the receiving region of the at least one frame element.

5. The vehicle according to claim 1, further comprising at least one base plate which is able to be or is fixed directly or indirectly to the at least one frame.

6. The vehicle according to claim 1, wherein the at least one wheel carrier comprises at least one continuous aperture through which the at least one wheel unit is accessible from a side of the at least one wheel carrier facing away from the at least one wheel unit.

7. A vehicle for transporting persons and/or goods, comprising at least one frame which comprises:
   at least one frame element which extends substantially parallel or obliquely to a longitudinal direction of the vehicle,
   at least one wheel carrier which is able to be detachably secured to the at least one frame element and which, together with the at least one frame element, forms a receiving region between the at least one wheel carrier and the at least one frame element in which the at least one wheel carrier and the at least one frame element are spaced apart from one another at least in sections so as to form a cavity,
   at least one wheel unit which comprises a wheel and is able to be fixed or is fixed in a rotatably mounted manner at least in the sections in the receiving region between the at least one wheel carrier and the at least one frame element, and
   at least one brake unit which comprises at least one brake disc which on a side of the at least one wheel unit facing the at least one wheel carrier in a rotationally fixed manner with the wheel is connectable or connected, and which comprises at least one clamping means arranged on the at least one wheel carrier, by means of which the at least one brake disc is able to be clamped.

8. The vehicle according to claim 7, wherein the at least one wheel carrier comprises of, on the side facing the at least one wheel unit, at least one holding means to which at least one line fixed to the at least one frame element is able to be fixed.

9. The vehicle according to claim 7, wherein the at least one wheel unit comprises at least one wheel bearing about which the wheel of the at least one wheel unit is rotatably mounted, which the at least one wheel bearing is able to be non-rotatably and releasably fixed to the at least one wheel carrier by means of a first wheel bearing element and/or is able to be non-rotatably fixed to an axle of the vehicle fixed to the at least one frame by means of a second wheel bearing element opposite the first wheel bearing element.

10. The vehicle according to claim 9, wherein at least one screw- or bolt-shaped fixing means, which comprises a head portion at one end and an external thread portion at the opposite end, and which is able to be inserted through at least one through-opening in the at least one wheel carrier and fixed in a recess in the at least one wheel bearing for joining the at least one wheel bearing to the at least one wheel carrier, wherein the at least one through-opening in the at least one wheel carrier has a diameter which is smaller than a diameter of the head portion of the fixing means and wherein the recess comprises an internal thread portion which is of a corresponding design to the external thread portion of the fixing means.

11. The vehicle according to claim 7, wherein the receiving region formed by the cavity between the at least one wheel carrier and the at least one frame element is formed by an area of the frame element which is recessed with respect to an extension in the direction of the vehicle, by a portion of the at least one wheel carrier which is integrally formed in a direction away from the at least one wheel unit and/or by at least one spacer element which spaces the at least one frame element and the at least one wheel carrier from one another.

12. The vehicle according to claim 11, wherein the recessed area of the at least one frame element is formed by an integrally formed portion of the at least one frame element and/or by a second recess.

13. The vehicle according to claim 11, wherein the at least one wheel carrier is able to be fixed or is fixed to the at least one frame element with one end or with two ends outside the receiving region of the at least one frame element.

14. The vehicle according to claim 7, further comprising at least one base plate which is able to be or is fixed directly or indirectly to the at least one frame and on which at least one additional load can be arranged.

15. The vehicle according to claim 7, wherein the at least one wheel carrier comprises at least one continuous aperture through which the at least one wheel unit is accessible from a side of the at least one wheel carrier facing away from the at least one wheel unit.

* * * * *